US009829771B2

(12) United States Patent
Ueno et al.

(10) Patent No.: US 9,829,771 B2
(45) Date of Patent: Nov. 28, 2017

(54) HOUSING FOR AN UNDERWATER VIDEO CAMERA

(71) Applicants: Okamoto Glass Co., Ltd., Kashiwa-shi, Chiba (JP); Pearl Giken Co., Ltd., Funabashi-shi, Chiba (JP)

(72) Inventors: Ariho Ueno, Kashiwa (JP); Daisuke Kojima, Shiroi (JP); Masami Katsuragawa, Tokyo (JP)

(73) Assignees: Okamoto Glass Co., Ltd., Kashiwa-shi (JP); Pearl Giken Co., Ltd., Funabashi-shi (JP)

( * ) Notice: Subject to any disclaimer, the term of this patent is extended or adjusted under 35 U.S.C. 154(b) by 340 days.

(21) Appl. No.: 14/601,814

(22) Filed: Jan. 21, 2015

(65) Prior Publication Data

US 2015/0138336 A1 May 21, 2015

Related U.S. Application Data

(63) Continuation of application No. PCT/JP2014/060942, filed on Apr. 17, 2014.

(30) Foreign Application Priority Data

Apr. 18, 2013 (JP) ................................. 2013-087132

(51) Int. Cl.
*H04N 9/47* (2006.01)
*G03B 17/08* (2006.01)
(Continued)

(52) U.S. Cl.
CPC .............. *G03B 17/08* (2013.01); *G03B 17/56* (2013.01); *G03B 35/08* (2013.01); *H04N 5/2252* (2013.01)

(58) Field of Classification Search
CPC ........ G03B 17/08; G03B 17/56; G03B 35/08; H04N 5/2252
See application file for complete search history.

(56) References Cited

U.S. PATENT DOCUMENTS 2,730,014 A   1/1956 Ivanoff et al.
3,320,018 A   5/1967 Pepke
(Continued)

FOREIGN PATENT DOCUMENTS

JP   61-163481 A    10/1986
JP   H02-141735 A    5/1990
(Continued)

OTHER PUBLICATIONS

Raymond S O et al "Spherical glass instrument housings for deep ocean use-their development and application", Challenges of Our Changing Global Environment'. Conference Proceedings. OCEANS '95 MTS/IEEE; Oct. 9-12, 1995; San Diego, CA, USA, Oct. 9, 1995; Oct. 9, 1995-Oct. 12, 1995 IEEE, New York, NY, USA.*

(Continued)

*Primary Examiner* — Sath V Perungavoor
*Assistant Examiner* — Puneet Dhillon
(74) *Attorney, Agent, or Firm* — Typha IP LLC

(57) ABSTRACT

The present invention provides a housing for use in an underwater video camera which does not require a window comprised from a thick parallel flat plate and large scale pressure resistant sealing container and which can take 3D images in deep water or hadal zone. A housing for an underwater video camera formed from a glass hollow sphere for housing an imaging video camera including filling a roughly spherical segmental shape correction lens to a spherical segment enclosed by a cutting plane parallel to a lens surface of an imaging lens of the imaging video camera housed inside the glass hollow sphere, the cutting plane being a flat surface facing the lens surface and an inner surface of a spherical crown of the glass hollow sphere cut out using the cutting plane.

6 Claims, 10 Drawing Sheets

(51) Int. Cl.
    *G03B 17/56*   (2006.01)
    *G03B 35/08*   (2006.01)
    *H04N 5/225*   (2006.01)

(56) References Cited

U.S. PATENT DOCUMENTS

| | | | | |
|---|---|---|---|---|
| 4,295,721 A * | 10/1981 | Rebikoff | ............... | G03B 17/08 |
| | | | | 396/26 |
| 5,481,613 A | 1/1996 | Ford | | |
| 6,404,560 B1 | 6/2002 | Hori | | |
| 2008/0316301 A1 * | 12/2008 | Givon | ................... | G03B 35/00 |
| | | | | 348/49 |

FOREIGN PATENT DOCUMENTS

| | | |
|---|---|---|
| JP | H09-505711 A | 6/1997 |
| JP | H11-122518 A | 4/1999 |
| JP | 2001-039387 A | 2/2001 |
| JP | 2005-128375 A | 5/2005 |
| JP | 2007-047686 A | 2/2007 |
| JP | 2009-060330 A | 3/2009 |
| JP | 2012-245944 A | 12/2012 |
| WO | 95/28784 A1 | 10/1995 |

OTHER PUBLICATIONS

Raymond S O et al "Spherical glass instrument housings for deep ocean use-their development and application", Challenges of Our Changing Global Environment. Conference Proceedings. OCEANS '95 MTS/IEEE; Oct. 9-12, 1995; San Diego, CA, USA, Oct. 9, 1995; Oct. 9, 1995-Oct. 12, 1995 IEEE, New York, NY, USA.*

JAMSTEC, Deep Ocean Floor Survey System DEEP TOW, Catalog, http://www.jamstecgo.jp/j/about/equipment/ships/deepto.html, Japan.
NiGK OCEAN, Products, Catalog, http://www.nichigi.co.jp/products/ocean/products/products_007.html, Japan.
NiGK OCEAN, Underwater Camera, Catalog, http://www.nishiyama.co.jp/products/s_i_machine/camera/index.html, Japan.
Nautilus, VITROVEX(R)-10" glass spheres, Catalog, Jan. 2012, Nautilus Marine Service GmbH, http://www.rsaqua.co.uk/uploads/pdfs/Products/Nautilus/Brochure_VITROVEX_10inch.pdf, Germany.
TELEDYNE BENTHOS, Inc., Flotation Glass Instrument Housings, Product Catalog 2010, Dec. 2009, pp. 1-8, Rev 121409, TELEDYNE BENTHOS, Inc., MA/USA.
International search report of PCT/JP2014/060942 dated Jul. 22, 2014, corresponding to this application.
Written Opinion of the International Searching Authority for PCT/JP2014/060942 which corresponds to this application.
JAMSTEC, Deep Ocean Floor Survey System DEEP TOW, Catalog, http://www.jamstecgo.jp/j/about/equipment/ships/deepto.html, Japan.
Nishiyama, Underwater Camera, Catalog, http://www.nishiyama.co.jp/products/s_i_machine/camera/index.html, Japan.
International search report of PCT/2014/060942 dated Jul. 22, 2014, corresponding to this application.
Written Opinion of the International Searching Authority for PCT/2014/060942 which corresponds to this application.
European search report of PCT/JP2014-060942 dated Nov. 6, 2015.
Raymond, et al: "Spherical glass instrument housings for deep ocean use-their development and application.", OCEANS, Oct. 9, 1995, pp. 1232-1239, vol. 2, New York, NY, USA, IEEE.
English translation of Written Opinion of the international Searching Authority dated Apr. 10, 2015, regarding PCT/JP2014/060942.

* cited by examiner

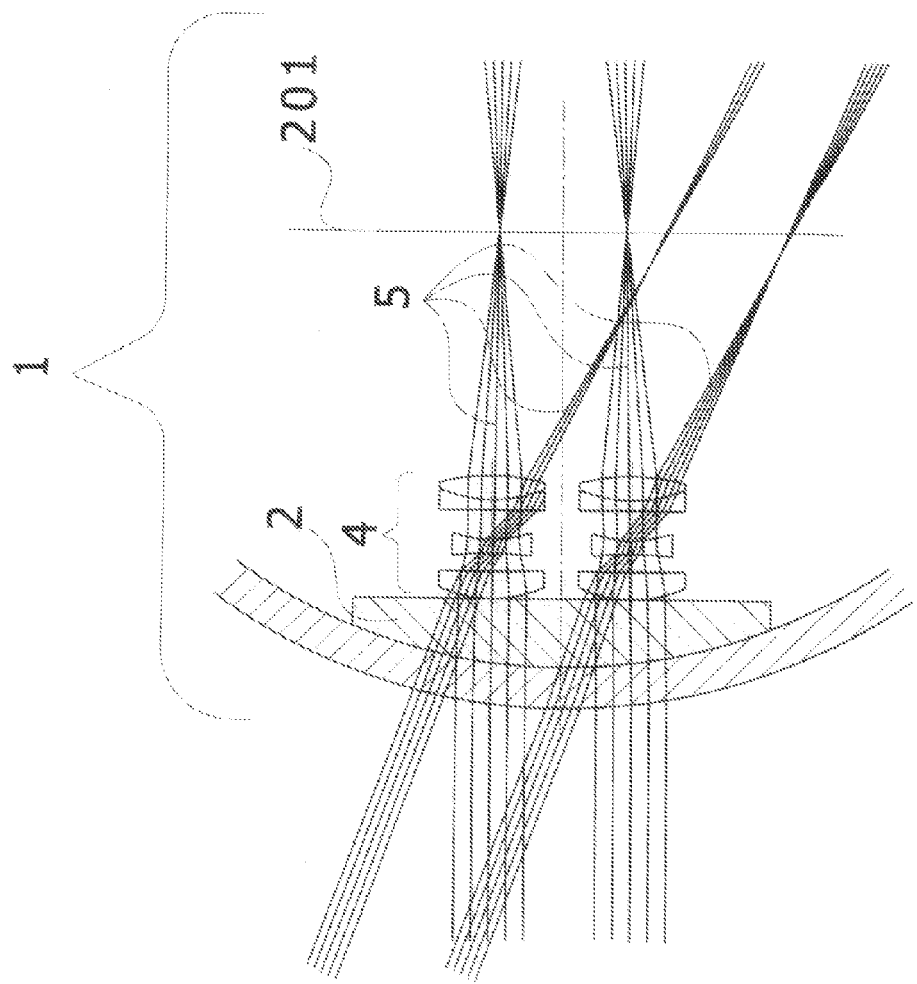

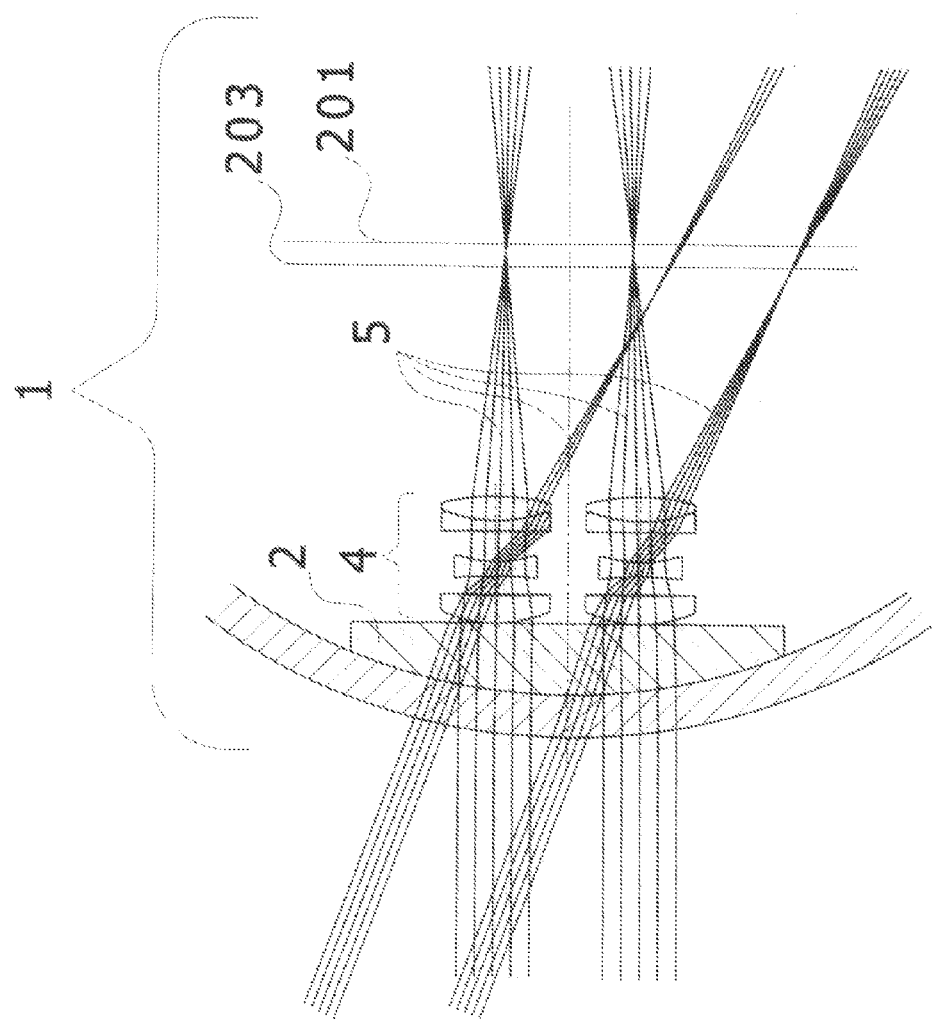

HOUSING FOR AN UNDERWATER VIDEO CAMERA

CROSS-REFERENCE TO RELATED APPLICATIONS

This application is based upon and claims the benefit of priority from the prior Japanese Patent Application No. 2013-087132, filed on 18 Apr. 2013, and PCT Application No. PCT/JP 2014/060942, filed on 17 Apr. 2014, the entire contents of which are incorporated herein by reference.

FIELD

The present invention is related to a housing for a video camera which houses a video camera for taking a video images underwater and in particular, the present invention is related to a housing for an underwater video camera including sufficient pressure resistance to be able to be used in the deep sea to a water depth of 300 m of more and a hadal zone of 5000 m of more.

BACKGROUND

In the case of taking pictures or video underwater, a camera or video camera is housed in a water proof housing arranged with an imaging transparent window in a position facing a lens surface of an imaging lens of a camera of video camera. Because the water pressure on the water proof housing increases as the depth of the water increases, there is a demand for pressure resistant sealing in the water proof housing which houses the video camera. For example, a titanium alloy high strength metal cylinder is used as a water proof housing which has this type of pressure resistant sealing. It is necessary to arrange a transparent window for imaging in the position which faces the lens surface of the imaging lens even in a water proof housing used deep underwater, and a parallel flat plate or dome shaped acrylic plate or glass plate is used as a window with a thickness which can withstand a certain water pressure. Furthermore, here a lens surface refers to a surface perpendicular to a light axis with respect to the rotation symmetrical axis of the imaging lens.

Because stress exceeding air pressure of 500 is applied in a hadal zone of 5000 m, it is not easy to manufacture a pressure resistant sealed housing which houses a camera or video camera at a practical cost. In recent years, a glass hollow sphere has been used the housing for housing electronic devices or control devices in the deep sea. This is because in an environment where a high level of stress is applied from all directions as in the deep sea, only a uniform compressive stress is applied on a glass hollow sphere and a tensile stress which causes the glass to break does not occur. Furthermore, the exchange of data or signals between electronic devices or control devices housed within the glass hollow sphere which is a sealed container is carried out by wireless communication (Japanese Examined Patent Application Publication H9-505711, Japanese Laid Open Patent H11-122518, Japanese Laid Open Patent 2005-128375, Japanese Laid Open Patent 2012-245944, http://www.jamstec.go.jp/j/about/equipment/ships/deepto.html, http://www.nichigi.co.jp/products/ocean/products/products_007.html, http://www.nishiyama.co.jp/products/s_i_machine/camera/index.html, http://www.nautilus-gmbh.com/eng/files/110524%20vitrovex_indroduction_144dpi.pdf, http://www.seatronics-group.com/assets/uploads/resources/2010/3/23ac0e35-5c5e-4e3b-9885-500ca02162cd.pdf).

SUMMARY

The present invention which solves the conventional problems described above discloses a housing for an underwater video camera formed from a glass hollow sphere 1 for housing an imaging video camera including filling a roughly spherical segmental shape correction lens 2 to a spherical segment 104 enclosed by a cutting plane 103 parallel to a lens surface of an imaging lens 4 of the imaging video camera 3 housed inside the glass hollow sphere, the cutting plane 103 being a flat surface facing the lens surface and an inner surface of a spherical crown 102 of the glass hollow sphere 1 cut out using the cutting plane. The glass hollow sphere 1, cutting plane 103, and the relationship between the spherical crown 102, spherical segment 104 and roughly spherical segmental shape correction lens 2 is shown in FIG. 4. Note that the shape of the correction lens is a roughly spherical segment and not completely spherical segment because it is cut out from a sphere segment with a perimeter of about a few mm especially because of handling.

BRIEF DESCRIPTION OF THE DRAWINGS

FIG. 9 is a light path diagram of a 3D image in the case where the difference in a refractive index between the glass hollow sphere 1 and roughly spherical segmental shape correction lens 2 is 0; and FIG. 10 is a light path diagram of a 3D image in the case where the difference in a refractive index between the glass hollow sphere 1 and roughly spherical segmental shape correction lens 2 is 0.06.

REFERENCE SIGNS LIST

Figure 1:
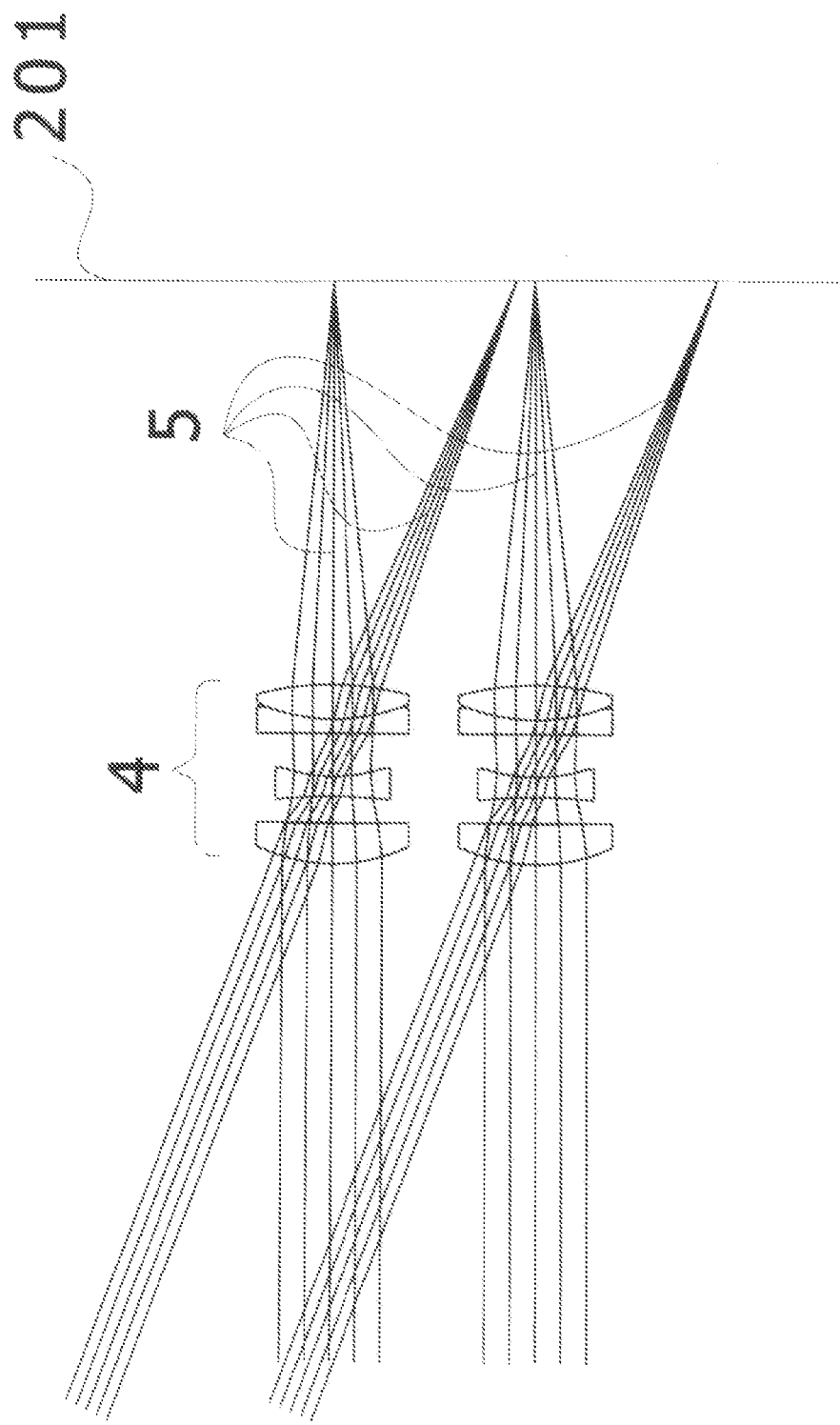
FIG. 1 is a light path diagram of a 3D image in the case where nothing is inserted between an object to be imaged and an imaging lens 4.

1 glass hollow sphere
2 roughly spherical segmental shape correction lens
3 imaging video camera 4 imaging lens of an imaging video camera
5 light path from an object to be imaged
101 spherical shell
102 spherical crown
103 cutting plane
104 spherical segment
201 regular imaging surface of an imaging lens
202 imaging surface moving to the rear from a regular imaging surface of an imaging lens
203 imaging surface moving to the front from a regular imaging surface of an imaging lens

DESCRIPTION OF EMBODIMENTS

In order to take three-dimensional images, a video camera for three-dimensional imaging mounted with a twin imaging lenses and two imaging elements which record images obtained through the twin imaging lenses is used. In addition, optical components inserted between the object to be imaged and an imaging lens, for example a window or filter which protects the imaging lens is required to be a parallel flat surface plate. In the case where a transparent plate comprised from a curved surface is inserted between the object to be imaged and the imaging lens, the path or light path length between the object to be imaged and two imaging lenses becomes different, a large aberration occurs between the two lenses and the two images taken by two imaging elements, the imaging position differs greatly, and either a clear image is not obtained or synthesis of a three-dimensional image does not function at all.

Figure 2:
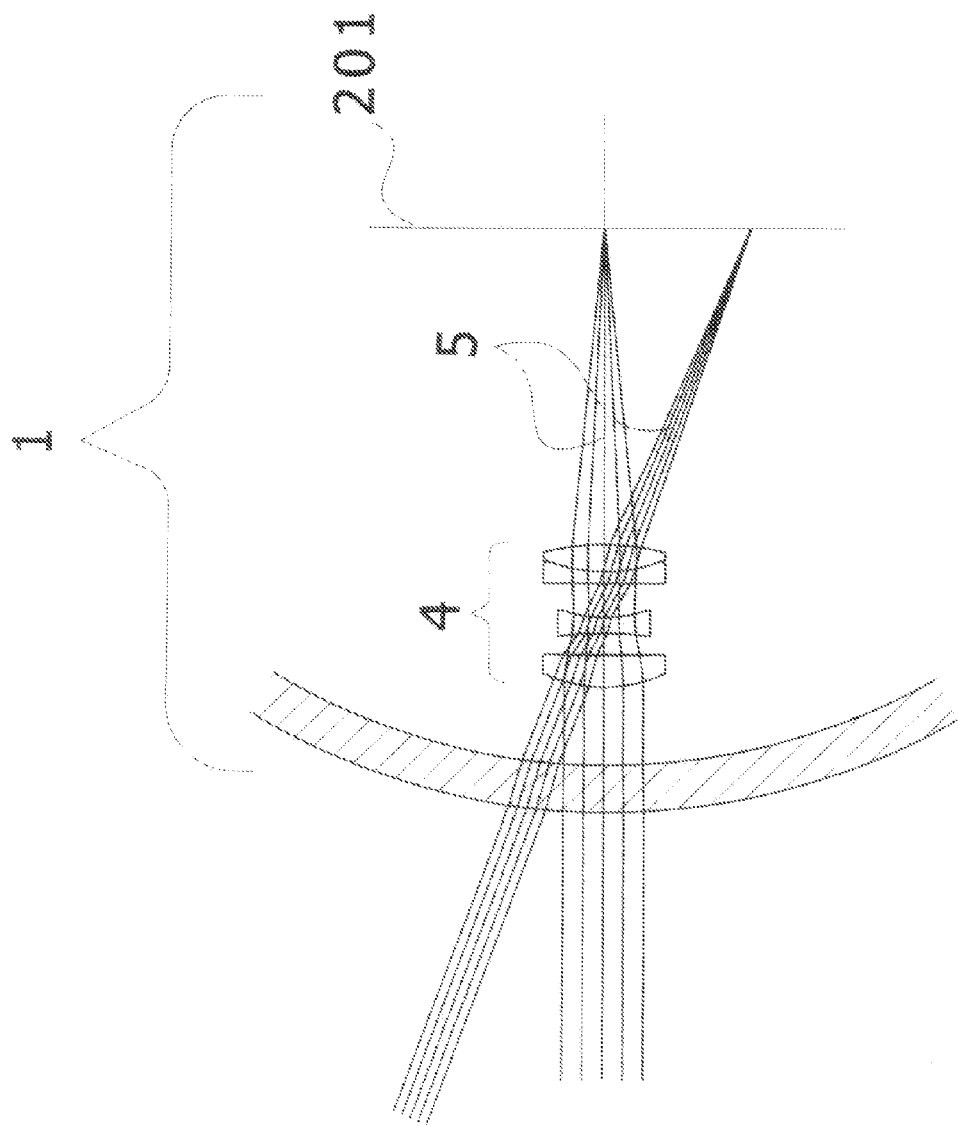
FIG. 2 is a light path diagram of a 2D image in the case where a transparent plate comprised from a curved surface is inserted between an object to be imaged and an imaging lens 4.
Figure 3:
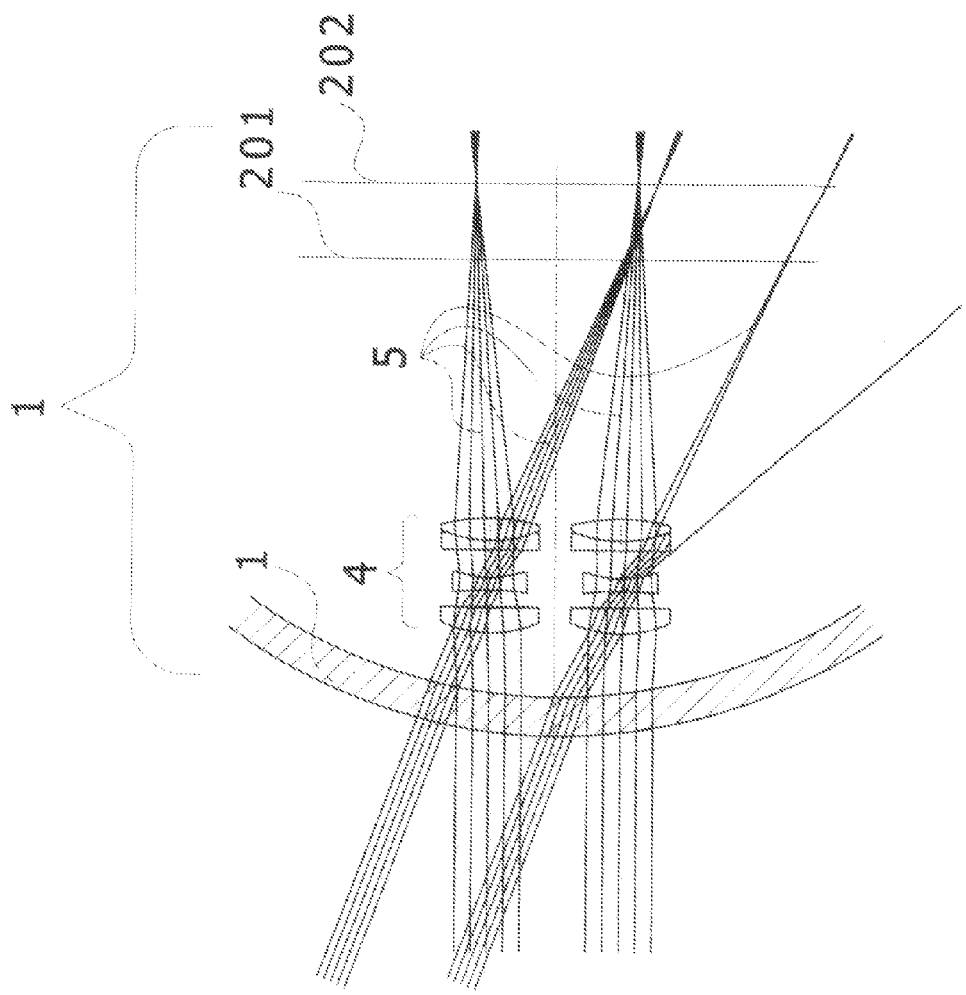
FIG. 3 is a light path diagram of a 3D image in the case where a transparent plate comprised from a curved surface is inserted between an object to be imaged and an imaging lens 4.
Figure 4:
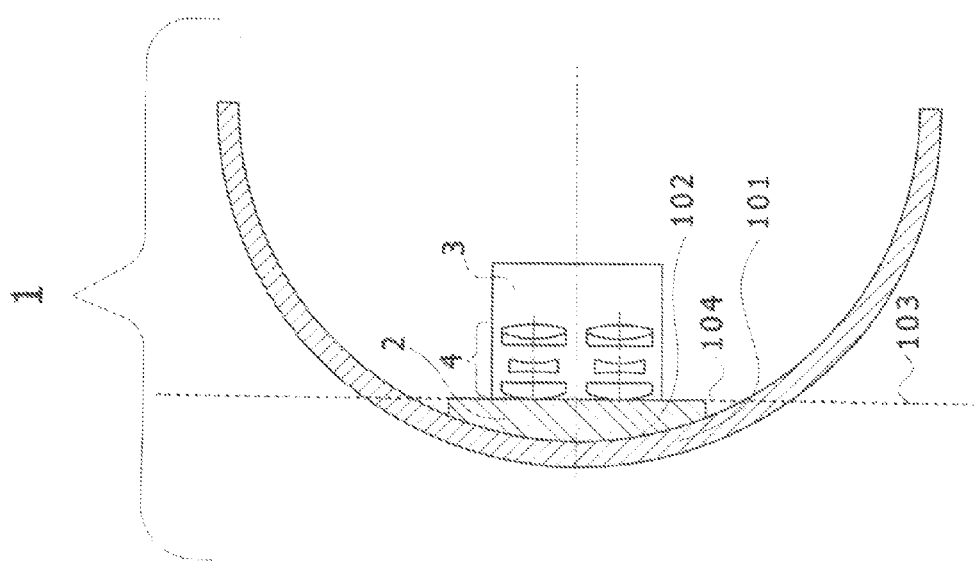
FIG. 4 is a cross-sectional diagram which shows a state where a video camera 3 is housed in a housing for an underwater video camera of the present invention.

Specifically, a three-dimensional image in the case where nothing is inserted between the object to be imaged and the imaging lens 4 as in FIG. 1, or in the case of a taking a two-dimensional image although a transparent plate comprised of a curved surface is inserted between the object to be imaged and the imaging lens 4 as in FIG. 2, although aberration is small, an image is imaged on the regular imaging surface 201 of the imaging lens and a clear image is obtained, when taking a three-dimensional image in the case where a transparent plate comprised of a curved surface is inserted between the object to be imaged and the imaging lens 4 as in FIG. 3, large aberration occurs the regular imaging surface 201 of the imaging lens, the imaging position moves to the imaging surface 202 which moves to the rear from the regular imaging surface of the imaging lens, a clear image is not obtained and a three-dimensional image is not synthesized.

When taking three-dimensional images under water, it is necessary to house and protect a video camera within a water proof housing. Therefore, a transparent window or the like must be present between the object to be imaged and the imaging lens. In addition, for the reasons described above, it is necessary that this transparent window be a parallel flat plate in order to take a three-dimensional image. Furthermore, because water pressure increases the deeper the water level, it is necessary to increase the water pressure resistance sealing of the water proof housing and it is necessary to also increase the pressure resistance (strength) of the window which is a transparent parallel flat plate. As a result, a large scale pressure resistant sealing container arranged with a resistant comprised from a thick transparent plate is necessary as a water proof housing for taking three-dimensional images which can be used in the deep sea (underwater).

On the other hand, as described above, a glass hollow sphere is being used as a water proof housing including pressure resistant sealing for deep sea or hadal zone. A video camera, lighting device, electronic or control devices, second batteries and sending and receiving signal devise etc are housed within the glass hollow sphere. However, three-dimensional images are not taken in a structure in which a three-dimensional image imaging video camera (referred to herein as 3D video camera) is housed internally. This is because as described above 3D images can not be taken if a glass sphere which forms the glass hollow sphere has a curved surface and not a parallel flat surface.

It is preferred that the imaging lens have a large aperture diameter in order to take bright images in a dark space such as the hadal zone. In this case, it is necessary to enlarge the window of the water proof housing in order to correspond with a large aperture diameter imaging lens. However, when a window comprised from a curved surface is arranged, significant aberration occurs, it is necessary to significantly increase the thickness of a window comprised from a parallel flat plate in order to withstand the water pressure and a large scale pressure resistant container is necessary.

The housing for an underwater video camera related to the present invention is based on solving the problem of warping of an image due to the shape of a curved surface of a spherical shell 101 and warping of an image due to the difference in refractive index between glass material used for the spherical shell 101, air within the glass hollow sphere and water outside the hollow sphere by filling a space between the glass spherical shell 101 which forms the glass hollow sphere 1 and the imaging lens 4 of the imaging video camera 3 housed within with a roughly spherical segmental shape correction lens 2.

The roughly spherical segmental shape correction lens 2 is filled so as to be parallel with the lens surface of the imaging lens 4 of the housed imaging video camera 3 and so as to contact an inner surface of the spherical crown 102 of the glass hollow sphere cut out along the cutting plane 103 which is flat and faces the lens surface. The filling may be performed by cementing the inner surface of the spherical crown 102 with the roughly spherical segmental shape correction lens 2 or by using an adhesive or fixing mechanically. Because aberration decreases and the amount of light loss due to reflection an interface deceases when there is no interval between the inner surface of the spherical crown 102 of the glass hollow sphere 1 and the roughly spherical segmental shape correction lens 2, the images taken becomes more vivid. On the other hand, it is necessary to arrange the flat bottom surface of the roughly spherical segmental shape correction lens 2 to face parallel to the lens surface of the imaging lens 4 of the imaging video camera 3.

Although the diameter of the glass hollow sphere 1 can be selected according to the size of the imaging video camera housed inside, usually the diameter is around 200 mm to 450 mm. However, although the thickness of the glass spherical shell 101 which forms the glass spherical sphere 1 depends on the depth of the water, it is preferred to be around 5 mm to 20 mm. In the case where the thickness is 5 mm or less, there is a risk of being crushed by water pressure and if the thickness is 20 mm or more, aberration increases due to an increase in the light path difference because of a difference in thickness, the weight of the glass hollow sphere itself increases which is not useful for handling.

In the housing for an underwater video camera related to the present invention, a structure is preferred in which the glass hollow sphere 1 is structured by joining a pair of glass hemispheres at the cross-section of the spherical shell 101. This is because although it is possible that it is useful and stronger to join two parts of a hollow sphere together with different sizes, it is cost effective to from two identical hemispheres. In this case, the roughly spherical segmental shape correction lens may be filled in either of the pair of glass hemispheres. An adhesive etc is not required for joining a pair of glass hemispheres. There is no problem with handling above water if the joined parts are covered with a rubber band for example, and the join surface is completely sealed when subjected to high water pressure underwater.

Although it is possible to exemplify borosilicate glass, aluminosilicate glass or an industrial glass such as soda-lime glass as the glass material used for the glass hollow sphere 1, considering lightness and the ease of manufacture, it is preferred to use borosilicate glass.

Finishing (surface smoothness) of the surface of the glass hollow sphere 1 and the surface of the roughly spherical segmental shape correction lens 2 is important for obtaining a vivid image and is preferred to have a surface arithmetic average roughness Ra of <50 nm. Although smoother the better, if the surface arithmetic average roughness Ra is <50 nm, it is possible to ignore the level of diffusion of light at an interface and it is possible to obtain a vivid 3D image. Here, arithmetic average roughness Ra is a center line average roughness stipulated by JIS B0601-2001 (definition and display of surface roughness). The bottom surface of the roughly spherical segmental shape correction lens 2 may contact with a housing tip part which is attached to the imaging lens 4 of the imaging video camera 3 or may be in close contact without actually contacting.

The roughly spherical segmental shape correction lens 2 is comprised from a transparent body and the refractive index $n_L$ of the transparent body is preferred to be in a range of $n_L=n_W+0.05$ when the refractive index of the glass which forms the spherical shell 101 of the glass hollow sphere 1 is $n_W$. Here, the refractive index $n_L$ and $n_W$ are refractive indexes in a wavelength of 589 nm of d line which is a bright line spectrum of an Na atom. It is possible to use an acrylic resin, silicon resin, polycarbonate resin, epoxy resin or polyester resin etc as the transparent body. Alternatively, it is also possible to use a transparent gel such as an elastomer resin or urethane resin. A glass material the same as the glass for forming the spherical shell 101 or a glass material in refractive index rage described above may also be used. When a gel shape material is used having flexibility and considering the possibility to absorb warping, it is useful since warping due to water pressure does not occur.

In order to reduce aberration, it is preferred that difference between the refractive index $n_L$ of the transparent body which forms the roughly spherical segmental shape correction lens 2 and the refractive index $n_W$ of the glass which forms the spherical shell 101 of the glass hollow sphere 1 be as small as possible. Specifically, it is preferred that the refractive index be in the range $n_L=n_W\pm0.05$ in order to take vivid 3D images. When the refractive index difference exceeds 0.05, lens effects occur at the interface between the glass hollow sphere 1 and the roughly spherical segmental shape correction lens 2, the imaging position varies significantly and the 3D images are no longer vivid. Although aberration is thought to be at its smallest when the glass hollow sphere 1 and roughly spherical segmental shape correction lens 2 are of the same material, when an acrylic resin with a refractive index of about $n_L$ 1.49 is used as the material of the roughly spherical segmental shape correction lens 2 with respect to the glass hollow sphere 1 with a refractive index of about $n_W$ 1.48, the aberration produced is small and a high level of translucency and excellent molding effects are obtained.

In order to take and record 3D images, the imaging video camera 3 which is housed is preferred to be a 3D video camera mounted with twin imaging lenses and two imaging elements which record images obtained through those imaging lenses. A 3D image is recorded by taking a right eye image and a left eye image through the two imaging lenses and is reproduced by synthesizing the right and left images using a polarized glass or liquid crystal shutter glass. Although it is possible to image and record a 3D image even in the case where two general video cameras mounted with one imaging lens and one imaging element which records an image obtained through the single imaging lens are installed, a component with a large diameter is necessary as a glass hollow sphere in order to house two video cameras and a size of the roughly spherical segmental shape correction lens sufficient to cover the lenses of two video cameras is necessary.

In the case of using a 3D video camera, because the refractive index of the air inside the glass hollow sphere 1, the glass material which forms the spherical shell 101 of the glass hollow sphere 1 and of the water (or sea water) outside the glass hollow sphere 1 is different, although the path of light which reaches two images elements which image and record images corresponding to images which enter left and right eyes respectively is different, in the case where a housing for an underwater video camera using the roughly spherical segmental shape correction lens 2 of the present invention, it is possible to take video the same as in the atmosphere.

Figure 5:
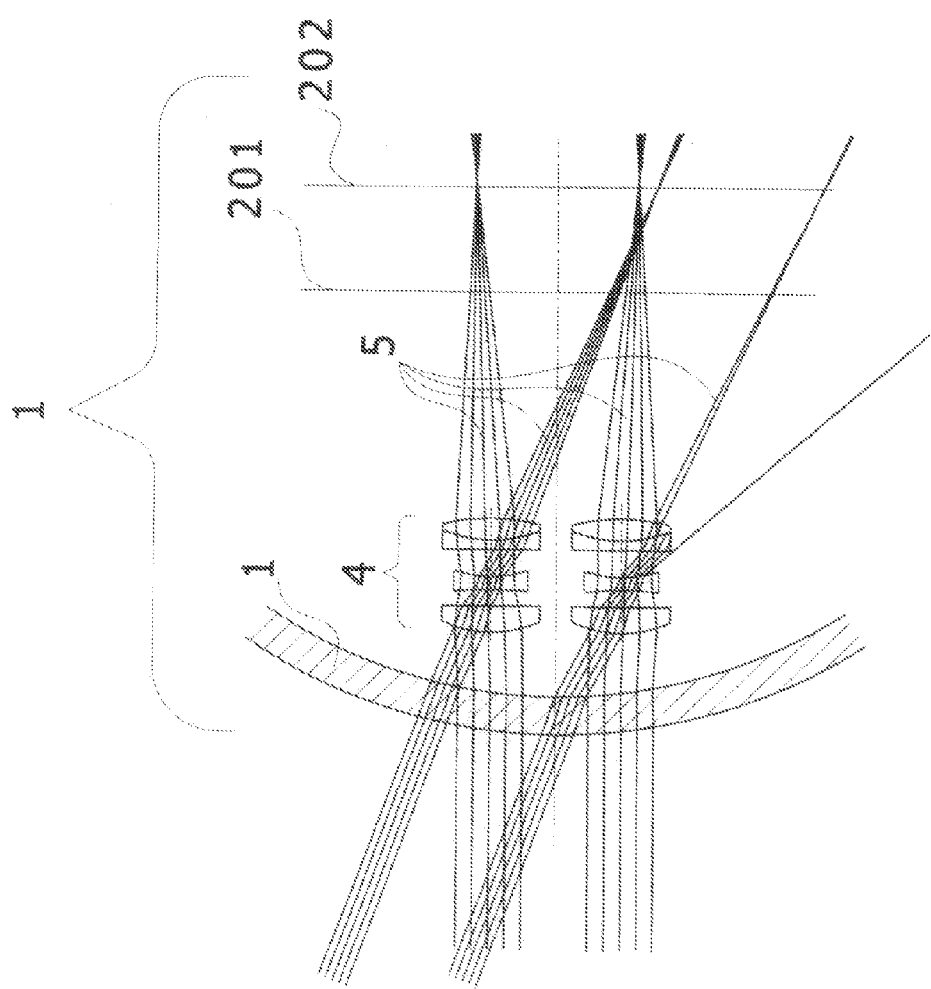
FIG. 5 is a light path diagram of a 3D image in the case where a roughly spherical segmental shape correction lens 2 is not used.
Figure 6:
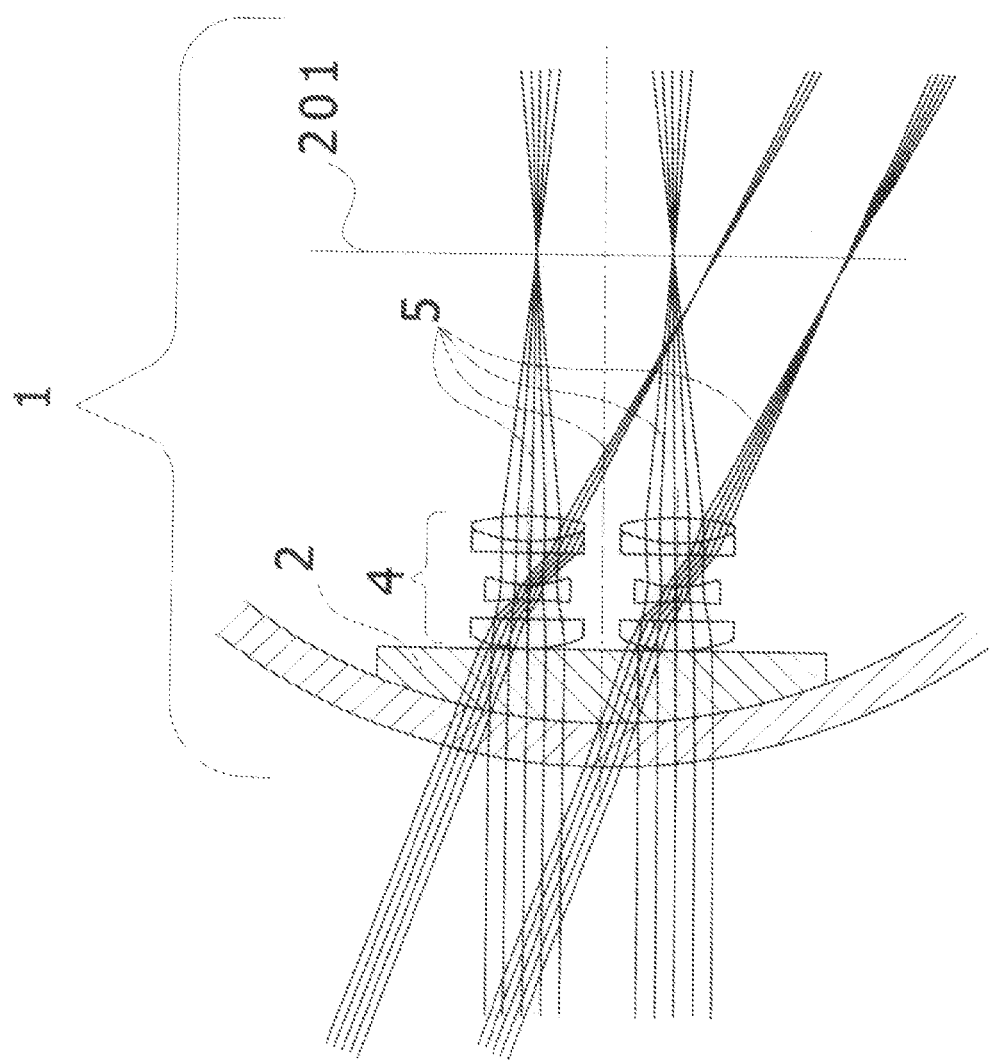
FIG. 6 is a light path diagram of a 3D image in the case where a roughly spherical segmental shape correction lens 2 is used.

Specifically, in the case where the roughly spherical segmental shape correction lens 2 is not used as is shown in FIG. 5, because significant aberration occurs in a regular image surface 201 of the imaging lens when taking 3D images, and the imaging position moves to the rear imaging surface 202 from the regular imaging surface of the imaging lens, a vivid image is not obtained and as a result a 3D image is not synthesized. On the other hand, as is shown in FIG. 6, in the case were the roughly spherical segmental shape correction lens 2 is used, aberration is small, an image can be formed on the regular surface of the imaging lens 201, a vivid image is obtained and a 3D image is synthesized.

If the housing for an underwater video camera which is the glass hollow sphere 1 filled with the roughly spherical segmental shape correction lens 2 related to the present invention is used, it is possible to withstand water pressure in a hadal zone of a water depth of 5000 m or more, it is possible to correct warping of a light path via the glass spherical shell 101 of the glass hollow sphere 1, and it is possible to take vivid 3D images using a 3D video camera from the inside of the glass hollow sphere 1. Although the glass hollow sphere 1 is recently used in many deep sea observation devices, it is possible to house a commercial 3D video camera used in the atmosphere by using this type of low cost glass hollow sphere 1 and as an a general purpose underwater video camera housing.

The present invention is explained in detail below using the examples. A product manufactured by Nautilus Marine Service GmbH was used as glass hollow hemispheres. The thickness of the glasses of the hollow hemispheres which form a spherical shell were 15 mm, and the hollow hemispheres have an exterior diameter of 330 mm, an interior diameter of 300, and the refractive index $n_W$ of the glass is 1.472.

EXAMPLES

Figure 7:
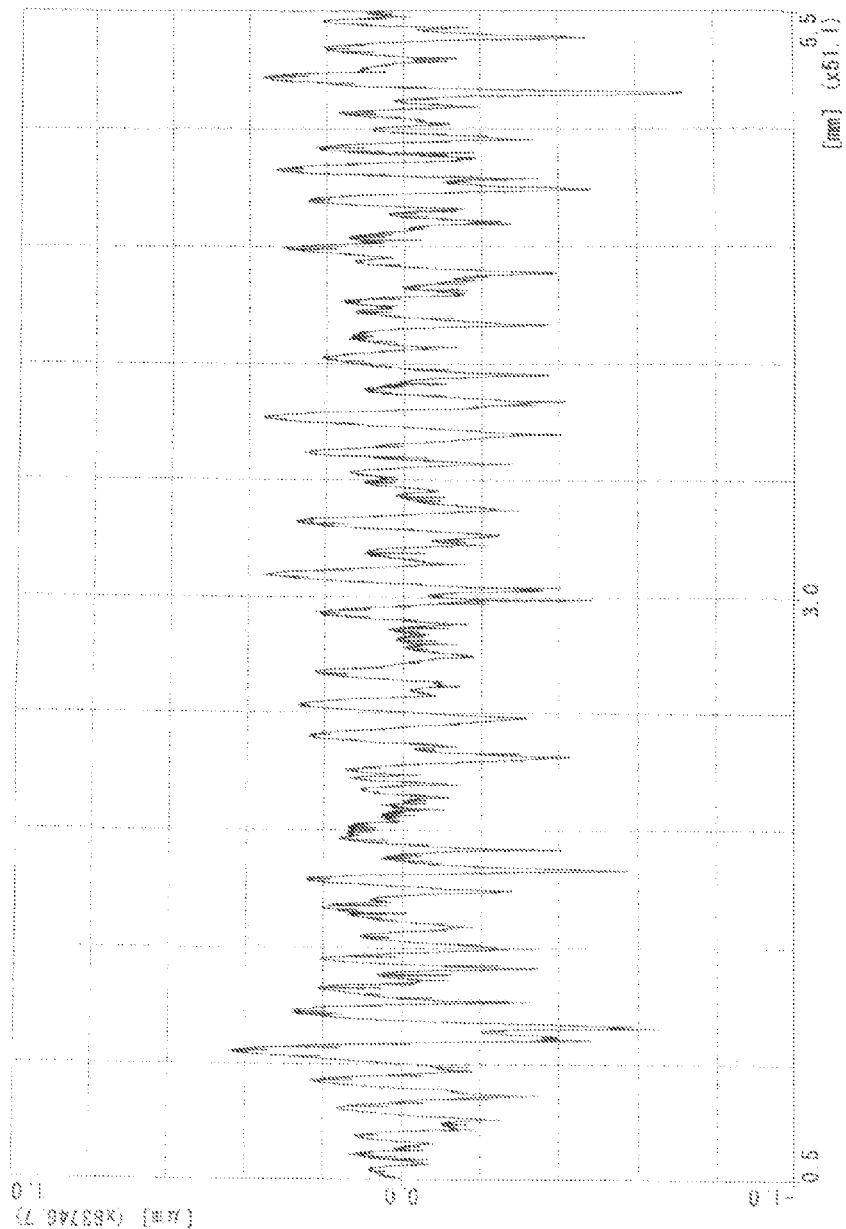
FIG. 7 shows measurement results of arithmetic average surface roughness Ra before a polishing process of a glass hollow sphere 1.
Figure 8:
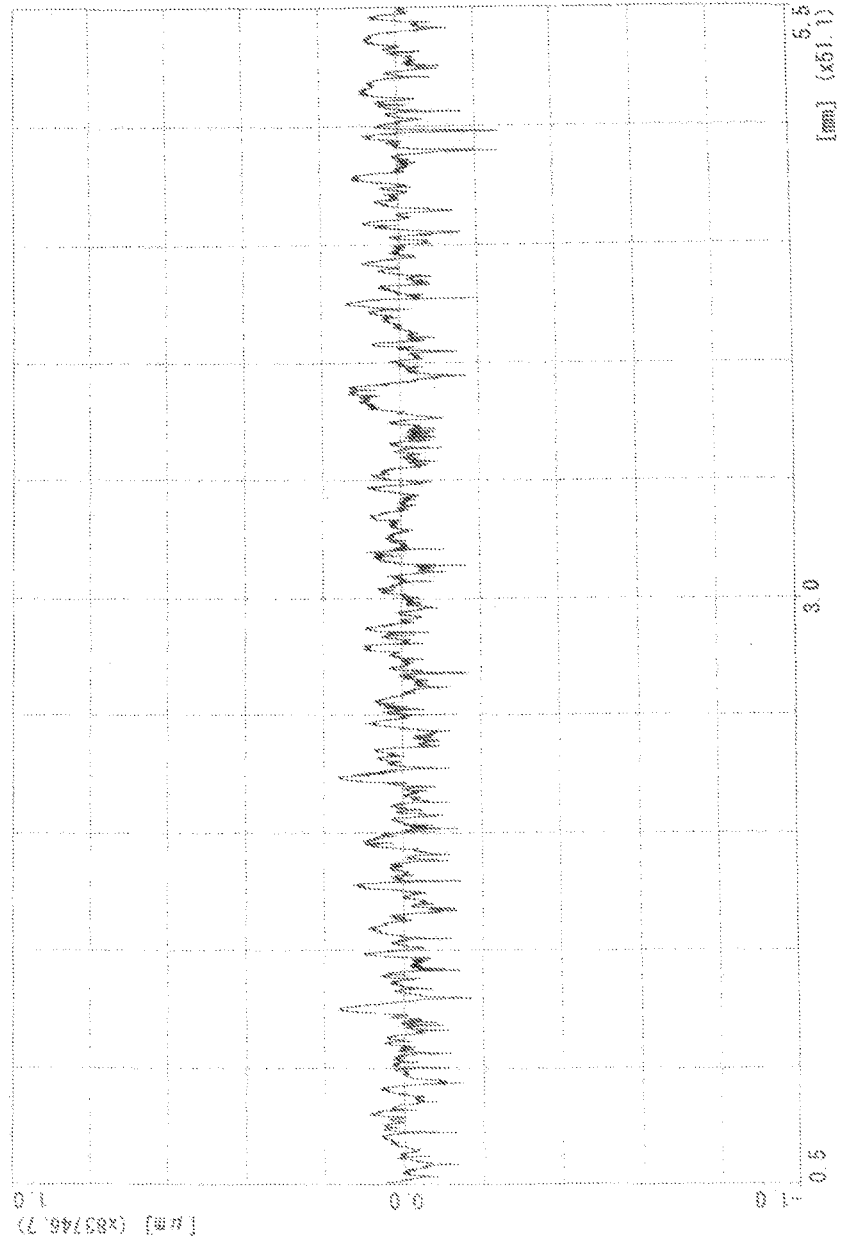
FIG. 8 shows measurement results of arithmetic average surface roughness Ra after a polishing process of a glass hollow sphere 1.

The results of measuring arithmetic average roughness Ra of inner surface center part surface of the glass hollow hemisphere are shown in FIG. 7 and were 50 nm or more with an Ra of 129 nm. Thus, polishing were performed so that it became less than 50 nm using an abrasive and a cotton cloth with cerium oxide as the main component. Again, the results of measuring Ra are shown in FIG. 8 which was less than 50 nm with an Ra of 40 nm. Furthermore, in FIG. 7 and FIG. 8, the horizontal axis shows a scanning line distance and has a range of 5 mm. The vertical axis shows a measurement value of surface roughness and has a range of ±1 μm.

A polymer molded product (refractive index $n_L$=1.49 manufactured by Shoritsu Plastics Kogyo) with methyl methacrylate as the raw material being polymerized and molded was used as the material for the roughly spherical segmental shape correction lens 2. By turning the polymerized and molded polymer molded acrylic cast round rod with a diameter of about 110 using a turning plate and performing further polishing, a spherical correction lens with a curvature radius of 150 mm was produced so as to contact the inner surface of the glass hollow sphere with an inner diameter of 300 mm. In the turning process using a turning plate, processing was performed so that the diameter of a bottom surface was 100 mm and the thickness of exterior edge was about 10 mm. Polishing was performed with a flannel cloth using a luster abrasive so that the arithmetic average roughness of the surface Ra was less than 50 nm. In this way, the produced roughly spherical segmental shape correction lens 2 was filled by fixing the periphery edge part to the center part inner surface of the glass hollow hemisphere using an adhesive wrapper.

A commercially available 3D digital HD video camera recorder (model number HDR-TD20V) manufactured by Sony was used as the 3D video camera 3. Twin high capacity lenses with a wide angle of 33.4 mm (35 mm equivalent) were mounted as the imaging lens 4 and the center distance of the twin lenses is 21 mm. The 3D video camera 3 was attached to four rubber feet of the inner surface of the glass hollow hemisphere, from there four support poles were extracted and fixed to a vinyl chloride plate, a hole was opened in the vinyl chloride plate and a screw was passed through the hole, and the 3D video camera 3 was attached using screw holes for a tripod of the 3D video camera. At this time, attachment was performed so that the lens surface of the imaging lens 4 and bottom surface of the roughly spherical segmental shape correction lens 2 of the 3D video camera 3 were parallel and facing each other.

Next, the glass hollow hemisphere filled with the roughly spherical segmental shape correction lens 2 and fixed to the 3D video camera 2 is joined with one more glass hollow hemisphere at each cross-sectional face of the spherical shell 101, the perimeter edge is wound with a butyl tape and sealed by further winding using a vinyl chloride tape. In this way, the 3D video camera 3 is housed within the housing for an underwater video camera using the present invention in which the roughly spherical segmental shape correction lens 2 is filled into the glass hollow sphere 1 including water resistance and pressure resistance.

3D imaging was performed in Enoshima Aquarium, Fujisawa City, Kanagawa Prefecture. After covering the housing for an underwater camera housing the 3D video camera with a kydac resin cover, it was attached to an aluminum frame. The front surface of the imaging lens of the 3D video camera 3 was arranged so that it would not be covered by the resin cover or aluminum frame in order to secure imaging vision. Lighting equipment or equipment for gathering mud from the sea bottom which can be used when imaging are attached to the aluminum frame in addition to the housing for an underwater video camera using the present invention housing the underwater video camera. Furthermore, a 20 kg weight was attached to the aluminum frame, immersed in water and the inside of the water tank was imaged through the spherical shell 101 of the glass hollow sphere 1.

Imaging was performed in 1 minute periods and stopped for 5 seconds between each period, and an IC substrate mounted with an interval timer imaging program was housed within the housing for the underwater video camera of the present invention and the program was executed while imaging for 1 minute and stopping for 5 seconds per each period. The obtained video was recorded on a memory card. After imaging was completed, the housing for an underwater video camera was gathered to the water surface, the vinyl chloride tape and butyl rubber tape were peeled off and the memory card was removed from the 3D video camera.

The recovered memory card was inserted into the memory card slot of a 3D display compatible computer (SONY VAIO (registered trademark) PCG-81314N), the images were played and when observed using 3D glasses (TDG-BR250 manufactured by SONY), it was possible to observe vivid 3D images. Beginning with rocks within the water tank as the background, swimming fish and floating objects within the tank appeared solid and it was possible to observe 3D images with a sense of depth.

Comparative Example

Comparative Example 1

Using the same method as in the Example, in the case where a roughly spherical segmental shape correction lens 2 was not used, even when 3D glasses were used for observation it was not possible to take 3D images, only ghost like double images could be seen and it was not possible to confirm 3D images.

Comparative Example 2

In the case of imaging using the same method as in the Example while the arithmetic average roughness Ra of a surface of the glass hollow sphere 1 remained at 129 nm as is shown in FIG. 7, a vivid 3D image could not be observed. On the other hand, in the case of imaging using the same method as in the Example after setting the R to 40 nm as is shown in FIG. 8 by performing a polishing process using an abrasive and cotton cloth with cerium oxide as the main component, it was possible to observe a vivid 3D image. Furthermore, a component polished until the surface Ra was less than 50 nm as described above was used as the roughly spherical segmental shape correction lens 2.

Comparative Example 3

The appearance imaging a light path in the case where the difference between the refractive index $n_L$ of a transparent body which forms the roughly spherical segmental shape correction lens 2 and the refractive index $n_W$ of the glass which forms the spherical shell 101 of the glass hollow sphere 1 is 0, and in the case where it is 0.06 are shown FIG. 9 and FIG. 10 respectively. In the case where the difference is 0, although aberration is small and an image is formed on the regular image surface of the imaging lens, in the case where the difference is 0.06, it could be seen that aberration is produced, the imaging surface moves from the regular imaging surface of the imaging lens to the imaging surface 203 moved to the front and a vivid 3D image was not obtained.

What is claimed is:

1. A housing for an underwater video camera formed from a glass hollow sphere, comprising:
   a glass hollow sphere;
   an imaging video camera for three-dimensional imaging mounted with twin imaging lenses housed inside the glass hollow sphere; and
   a roughly spherical segmental shape correction lens the roughly spherical segmental shape corrections lens settled on a spherical segment of the glass hollow sphere, the spherical segment enclosed by a cutting plane parallel to a lens surface of the twin imaging lenses, the cutting plane being a flat surface facing the lens surface and an inner surface of a spherical crown of the glass hollow sphere cut out using the cutting plane,
   wherein an arithmetic average roughness Ra of a surface of the glass hollow sphere and a surface of the roughly spherical segmental shape correction lens is less than 50 nm.

2. The housing for an underwater video camera according to claim 1, wherein a pair of glass hollow hemispheres of the glass hollow sphere are joined together at a cross sectional face of the spherical shell.

3. A housing for an underwater video camera formed from a glass hollow sphere, comprising:
   a glass hollow sphere;
   an imaging video camera for three-dimensional imaging mounted with a twin imaging lenses housed inside the glass hollow sphere; and
   a roughly spherical segmental shape correction lens the roughly spherical segmental shape correction lens settled on a spherical segment of the glass hollow sphere, the spherical segment enclosed by a cutting plane parallel to a lens surface of the twin imaging lenses, the cutting plane being a flat surface facing the lens surface and an inner surface of a spherical crown of the glass hollow sphere cut out using the cutting plane,
   wherein the roughly spherical segmental shape correction lens is comprised from a transparent body, wherein the refractive index $n_L$ of the transparent body is in a range of $n_L = n_W \pm 0.05$ when the refractive index of glass which forms the spherical shell of the glass hollow sphere is $n_W$.

4. The housing for an underwater video camera according to claim 3, wherein a pair of glass hollow hemispheres of the glass hollow sphere are joined together at a cross sectional face of the spherical shell.

5. The housing for an underwater video camera according to claim 1, wherein the roughly spherical segmental shape correction lens is comprised from a transparent body, wherein the refractive index $n_L$ of the transparent body is in a range of $n_L = n_W \pm 0.05$ when the refractive index of glass which forms the spherical shell of the glass hollow sphere is $n_W$.

6. The housing for an underwater video camera according to claim 5, wherein a pair of glass hollow hemispheres of the glass hollow sphere are joined together at a cross sectional face of the spherical shell.

* * * * *